US012267642B2

(12) United States Patent
Chan et al.

(10) Patent No.: US 12,267,642 B2
(45) Date of Patent: Apr. 1, 2025

(54) HEARING DEVICE

(71) Applicant: Sivantos Pte. Ltd., Singapore (SG)

(72) Inventors: Hoong Yih Chan, Singapore (SG); Firdaus Prabowo, Kepulauan Riau (ID); Agustiar Agustiar, Singapore (SG); Shinq Yee Chia, Singapore (SG)

(73) Assignee: Sivantos Pte. Ltd., Singapore (SG)

( * ) Notice: Subject to any disclaimer, the term of this patent is extended or adjusted under 35 U.S.C. 154(b) by 281 days.

(21) Appl. No.: 17/839,793

(22) Filed: Jun. 14, 2022

(65) Prior Publication Data

US 2022/0400333 A1 Dec. 15, 2022

(30) Foreign Application Priority Data

Jun. 14, 2021 (DE) .................... 10 2021 206 009.9

(51) Int. Cl.

| | |
|---|---|
| ***H04R 1/28*** | (2006.01) |
| ***H04R 1/04*** | (2006.01) |
| ***H04R 25/00*** | (2006.01) |

(52) U.S. Cl.

CPC ............... *H04R 1/288* (2013.01); *H04R 1/04* (2013.01); *H04R 25/456* (2013.01); *H04R 25/65* (2013.01)

(58) Field of Classification Search

CPC ........ H04R 1/288; H04R 1/04; H04R 25/456; H04R 25/65; H04R 25/604; H04R 2225/021; H04R 2225/23; H04R 2225/25

See application file for complete search history.

(56) References Cited

U.S. PATENT DOCUMENTS

| | | | | |
|---|---|---|---|---|
| 3,019,306 | A * | 1/1962 | Weiss | |
| 3,257,516 | A * | 6/1966 | Knowles | |
| 3,692,264 | A * | 9/1972 | Burkhard ............ | G04B 43/002 206/583 |
| 4,854,415 | A | 8/1989 | Goschke | |
| 8,259,975 | B2 | 9/2012 | Bally et al. | |
| 8,693,718 | B2 * | 4/2014 | Agustiar ............. | H04R 25/604 381/322 |
| 10,051,383 | B2 | 8/2018 | Margot et al. | |
| 10,284,967 | B2 * | 5/2019 | Lee ...................... | H04R 23/002 |
| 10,405,085 | B2 * | 9/2019 | Tiefanau et al. | |
| 11,019,435 | B2 * | 5/2021 | Flaig .................... | H04R 25/456 |
| 11,082,777 | B2 * | 8/2021 | Friis ..................... | H04R 25/456 |
| 12,089,001 | B2 * | 9/2024 | Chan et al. | |
| 2008/0112584 | A1 | 5/2008 | Karamuk | |
| 2014/0153755 | A1 | 6/2014 | Hug et al. | |

FOREIGN PATENT DOCUMENTS

| | | | |
|---|---|---|---|
| DE | 102008045668 | A1 | 3/2010 |
| DE | 102009033317 | A1 | 9/2010 |
| EP | 3179742 | B1 | 11/2019 |
| WO | 2014013353 | A1 | 1/2014 |

* cited by examiner

*Primary Examiner* — Forrest M Phillips
*Assistant Examiner* — Joseph James Peter Illicete
(74) *Attorney, Agent, or Firm* — Laurence A. Greenberg; Werner H. Stemer; Ralph E. Locher

(57) ABSTRACT

A hearing device containing a housing enclosing a housing interior, and a loudspeaker for generating acoustic signals. In addition, the hearing device contains a damping element formed by a damping mat, which is interposed between the loudspeaker and a wall of the housing or a loudspeaker box. The damping mat contains at least one damping chamber filled with fluid.

20 Claims, 3 Drawing Sheets

HEARING DEVICE

CROSS-REFERENCE TO RELATED APPLICATION

This application claims the priority, under 35 U.S.C. § 119, of German Patent Application DE 10 2021 206 009.9, filed Jun. 14, 2021; the prior application is herewith incorporated by reference in its entirety.

FIELD AND BACKGROUND OF THE INVENTION

The invention relates to a hearing device, for example in the form of a hearing aid.

Hearing devices are typically used to output an audio signal to the sense of hearing of the wearer of the hearing device. The output takes place by means of an output transducer, usually acoustically via airborne sound by means of a loudspeaker (also referred to as a “receiver”). Such hearing devices are frequently used as so-called hearing aid devices (also in short: hearing aids). For this purpose, the hearing devices normally contain an acoustic input transducer (in particular a microphone) and a signal processor, which is configured to process the input signal (also: microphone signal) generated by the input transducer from the ambient sound with application of at least one typically user-specific stored signal processing algorithm in such a way that a hearing loss of the wearer of the hearing device is at least partially compensated for. In particular in the case of a hearing aid device, the output transducer can be, in addition to a loudspeaker, alternatively also a so-called bone vibrator or a cochlear implant, which are configured for mechanical or electrical coupling of the sound signal into the sense of hearing of the wearer. The term hearing devices also additionally includes in particular equipment such as, e.g., so-called tinnitus maskers, headsets, headphones, and the like.

Typical designs of hearing devices, in particular hearing aids, are behind-the-ear (“HdO” or “BTE”) and in-the-ear (“IDO” or “ITE”) hearing devices. These designations are indicative of the intended wearing position. For example, behind-the-ear hearing devices have a (main) housing that is worn behind the ear cup. Here the models can be distinguished into two types: the first being those having the loudspeaker arranged in this housing. In these the sound is usually output to the ear by means of a sound tube, the end of which is worn positioned in the ear canal. The second type includes models that have an external loudspeaker placed in the auditory canal. In-the-ear hearing devices, on the other hand, have a housing that is worn in the ear cup or even entirely in the ear canal.

In particular in hearing aids for people with severe hearing loss—usually in BTE hearing aids—particularly powerful loudspeakers are used, which can generate a comparatively high sound pressure level (e.g. of at least about 90 dB SPL). To prevent the sound produced from affecting other components, in particular the microphone or microphones, the loudspeakers are placed in an additional enclosure (“loudspeaker box”) within the hearing aid housing. In this loudspeaker box, the loudspeaker is usually suspended by means of an elastomer cover and/or supported only at certain points in order to prevent transmission of structure-borne sound to the other components. In addition, the loudspeaker with its sound output nozzle—usually even independently of the loudspeaker box—is connected by means of an internal sound conducting element, usually a flexible tube, to a sound outlet opening of the hearing device, in the case of a BTE usually to a sound tube leading from the BTE housing to the ear.

Especially in such high-performance loudspeakers, however, so-called pumping effects often occur in the flexible sound conducting elements, which reduce the achievable gain. In some cases, feedback can occur in the range of approximately 1 to 2 kHz due to structure-borne sound and in the range of approximately 3-5 kHz due to airborne-sound feedback (also known as open loop gain feedback).

SUMMARY OF THE INVENTION

The object of the invention is to specify an improved hearing device.

This object is achieved according to the invention by a hearing device having the features of the independent claim. Advantageous embodiments and refinements of the invention, which are partially inventive as such, are presented in the dependent claims and the following description.

The hearing device according to the invention has a housing that encloses a housing interior, as well as a loudspeaker for generating acoustic signals. The hearing device also contains a damping element formed by a damping mat, i.e. having at least one of these, which is interposed between the loudspeaker and a wall of the housing or a loudspeaker box (in particular one arranged within the housing). The damping mat contains at least one damping chamber filled with fluid.

The fact that the damping mat has a fluid-filled damping chamber that is interposed between the loudspeaker and the wall means that it can advantageously absorb vibrations and/or shocks in the direction between the loudspeaker and the wall and in fact to a greater extent, in particular in comparison to bearing elements made of only one elastomer. This can also reduce the movements of the loudspeaker in the direction of the plane of the damping mat.

The loudspeaker is preferably braced (or: mounted) against the wall via only one side face by means of the damping element. Other side faces of the loudspeaker are preferably free of contact with the wall or other components of the hearing device, in particular elements not belonging to the damping element. This reduces the transmission of vibrations to other components of the hearing device.

Preferably, the wall against which the loudspeaker is mounted by means of the damping element is an external wall, in particular of the housing of the hearing aid. This has a comparatively high rigidity and, in comparison to the loudspeaker, also a high mass, which also enables an effective damping of vibrations.

Preferably, the hearing device is a BTE hearing aid, or “BTE” for short.

In a preferred embodiment, the damping mat has a support layer formed from a first elastomer. This support layer forms at least one (or the) fluid-filled damping chamber between the loudspeaker and the loudspeaker box.

In one practical development, this support layer comprises a number of pillar-like support elements. These brace the damping chamber against the loudspeaker, the wall, or a covering layer of the damping mat. In other words, the support elements help to ensure that the damping chamber retains its proper shape, at least in normal usage as intended. In particular, the support elements also help to distribute loads evenly over the (or at least almost the) entire surface of the damping mat under loading. The support elements also help to increase the shear strength of the damping element.

In a further practical development, the support layer preferably forms a trough. The term "trough" is preferably understood here to mean that the support layer has lateral walls bounding a recess. The support elements described above project upwards from the floor of the trough, i.e. from its "trough floor". In addition, the trough is closed off by means of a covering layer which is preferably made of a second elastomer which is stiffer than the first elastomer.

Preferably, the damping element is produced in a multi-component injection molding process, wherein the support layer is first formed in the shape of the trough (with the supports formed in it) and then closed off with the covering layer in a second injection molding process.

Alternatively, the covering layer is connected to the trough in a later stage, for example in a form of sealing process.

Preferably, the support layer contains—in particular in a wall that bounds the recess of the trough—an injection opening through which the damping chamber is filled with the fluid. This injection opening is sealed off by means of a self-repairing elastomer, e.g. a self-repairing rubber. Optionally, the entire support layer is formed from the self-repairing elastomer. The self-repairing elastomer forms a kind of pressure valve or "seal", so that after an injection of the fluid the injection opening is automatically sealed off. Such self-repairing elastomers are known, for example, for closures of blood collection tubes or the like. For example, the "self-repairing effects" of such elastomers are based on the formation of hydrogen bonds.

In a practical embodiment, the damping element has at least one retaining loop, in particular formed from the second elastomer. The loudspeaker is held against the damping mat by means of this retaining loop. Preferably, the shape of the retaining loop is already matched to the external geometry of the loudspeaker. In particular, the retaining loop thus forms a rectangular shape. Preferably, the damping element comprises two such retaining loops.

In an alternative embodiment, the loudspeaker is glued onto the damping element.

In another practical embodiment, the loudspeaker has an open front volume and is preferably arranged in the loudspeaker box mentioned above, arranged inside the housing. In this case, in particular one complete side face of the loudspeaker (in particular the one adjacent to the loudspeaker diaphragm) is missing, so that the retention by means of the one or two retaining loops would not be possible or would at least reduce the positive effect of the open front volume.

In a practical development, in particular of the embodiment of the loudspeaker with the open front volume, the loudspeaker is arranged inside the loudspeaker box without a sound tube. This avoids or at least reduces the transmission of vibrations, in particular due to so-called pump effects of the sound tube or also due to acoustic feedback caused by changes in air pressure as a result of such pumping, and/or a resulting limitation of the achievable gain.

The conjunction "and/or" here and in the following is to be understood, in particular, to mean that features linked by means of this conjunction can be implemented both jointly and as alternatives to each other.

Other features which are considered as characteristic for the invention are set forth in the appended claims.

Although the invention is illustrated and described herein as embodied in a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts corresponding to one another are always provided with the same reference signs in all figures.

Figure 1:
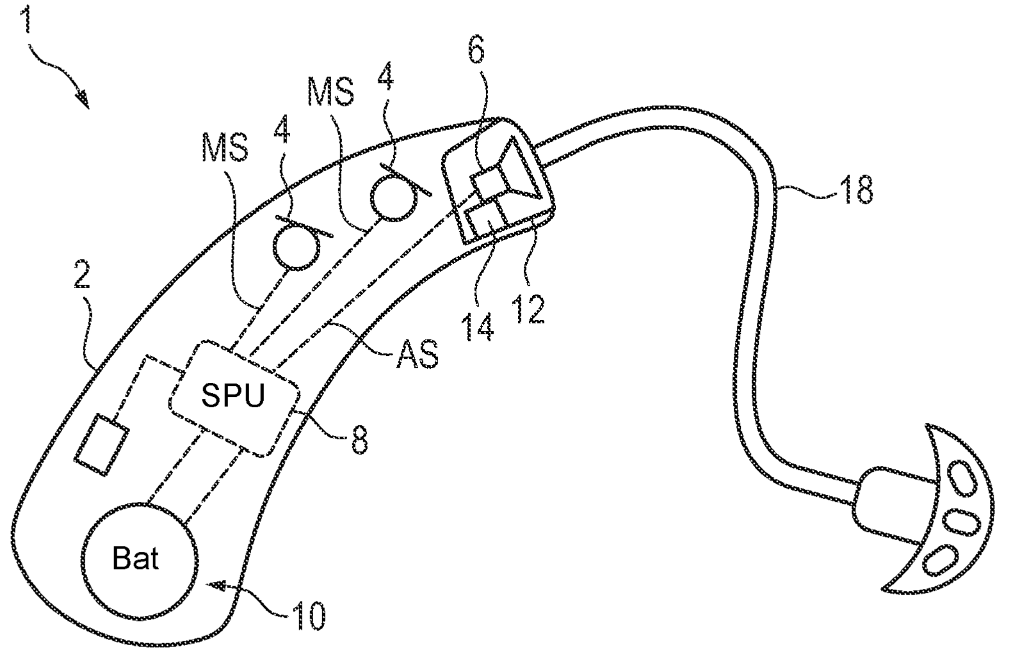
FIG. 1 is a schematic illustration of a hearing device.

Referring now to the figures of the drawings in detail and first, particularly to FIG. 1 thereof, there is shown a hearing device in the form of hearing aid equipment, specifically hearing aid equipment to be worn behind the ear of the user (also referred to as hearing aid for short; denoted here as "BTE 1"). The BTE 1 contains a housing 2, in which electronic components of the BTE 1 are arranged. These electronic components are, for example, two microphones 4, a loudspeaker 6, a signal processor 8, and a battery module 10. The microphones 4 are used in the intended operation of the BTE 1 for receiving ambient sound and converting it into electrical input signals (also: "microphone signals MS"), which are processed (in particular filtered, amplified and/or damped depending on frequency, etc.) by the signal processor 8 (also referred to as "controller"). The processed input signals are subsequently output at the loudspeaker 6 as output signals AS and converted thereby into sound signals and transmitted to the hearing system of the user.

In order to protect the microphones 4 from feedback with the loudspeaker 6, the latter is enclosed in a loudspeaker box ("box 12" for short) arranged inside the housing 2. In the box 12, the loudspeaker 6 is attached, decoupled from vibration as far as possible, by means of a damping element 14 described in more detail below.

In principle, however, the box 12 can also be omitted.

Figure 2:
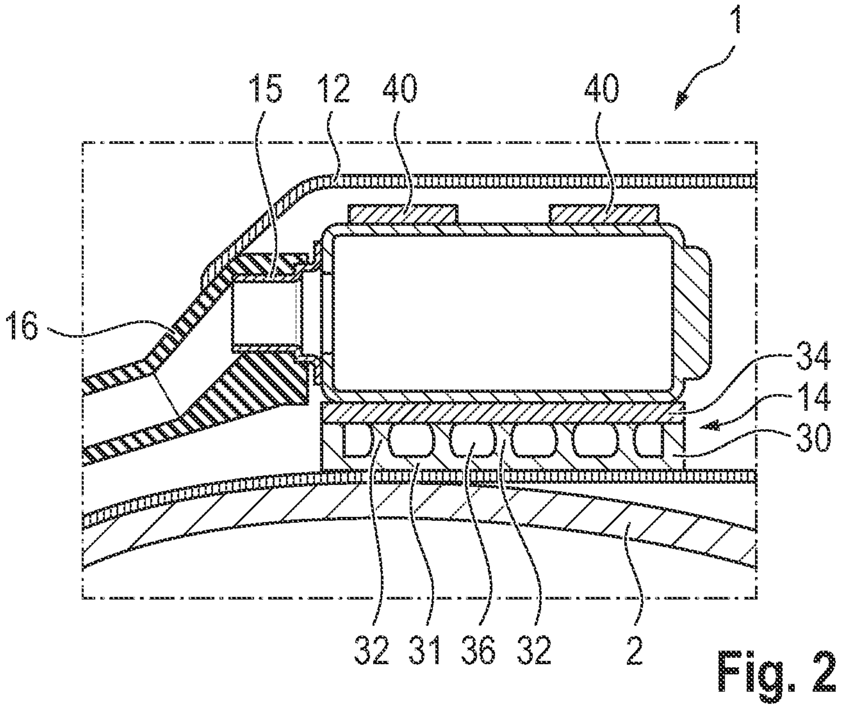
FIG. 2 is a schematic partial sectional view of the hearing device.

As can be seen from FIG. 2, a sound output nozzle 15 of the loudspeaker 6 is connected to sound tube 16 which is configured to guide the airborne sound generated by the loudspeaker 6 into an additional sound tube 18 leading from the housing 2 to the user's ear.

In addition, the loudspeaker 6 is connected in the box 12 to a floor wall 26 of the box 12 (see also FIG. 5), which in turn is connected to the outer wall of the housing 2. In this case, the damping element 14 mentioned above is interposed between the two parts.

Figure 4:
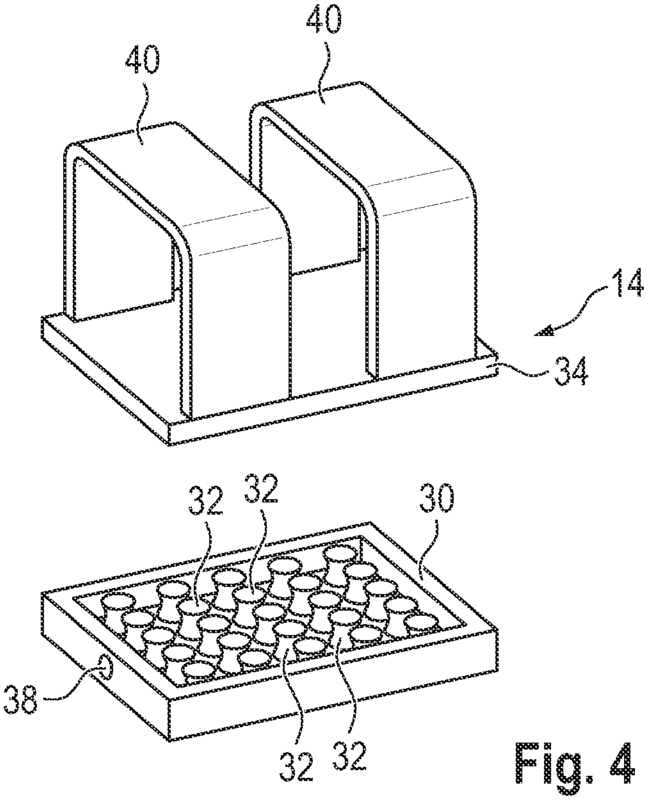
FIG. 4 is a perspective exploded view of the damping element.

The damping element 14 contains a damping mat (see also FIG. 4). This is formed by a damping layer 30 (also called "support layer") consisting of a first elastomer with comparatively low Shore hardness and has an approximately rectangular trough, from the trough floor 31 of which as a support structure a plurality of pillars 32 project upwards, which have an approximately hourglass-like longitudinal section. The trough is closed off by a covering layer 34 consisting of a second elastomer with higher Shore hardness, so that the interior of the trough forms a gas-filled damping chamber 36 that is carried or supported by the pillars 32.

To manufacture the damping element 14, the damping layer 30 is first formed, e.g. injection molded. The trough formed by the damping layer 30 is then closed off with the covering layer 34, for example in a multi-component injection molding process or by sealing the covering layer 34 onto the damping layer 30. Subsequently, a fluid, in particular a gas, a liquid, or even a mixture of gas and liquid, is injected into the damping chamber 36 via an injection channel 38 (or: injection opening). The injection channel 38 is sealed off by means of a self-repairing elastomer so that the injection channel 38 closes again automatically after an injection needle (or canula, etc.) is removed.

Figure 3:
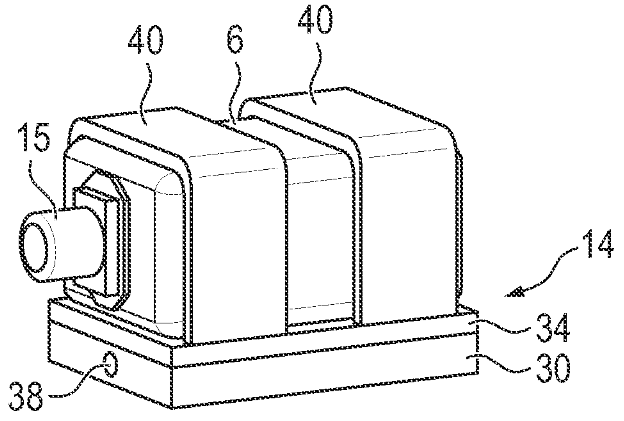
FIG. 3 is a perspective, detail view of a loudspeaker and a damping element of the hearing device.

For mounting the loudspeaker 6, in the exemplary embodiment shown in FIGS. 2 to 4, two retaining loops 40 are connected to the covering layer 34, in particular molded jointly therewith. These retaining loops 40 are configured in such a way that the loudspeaker 6—when pushed under these retaining loops 40—is held by them on the covering layer 34 in a force-fitting manner, i.e. by means of a clamping action.

If the box 12 is not present, the damping element 14 is glued to a wall, specifically its inside, of the housing 2 or the box 12, specifically its floor wall 26.

Figure 5:
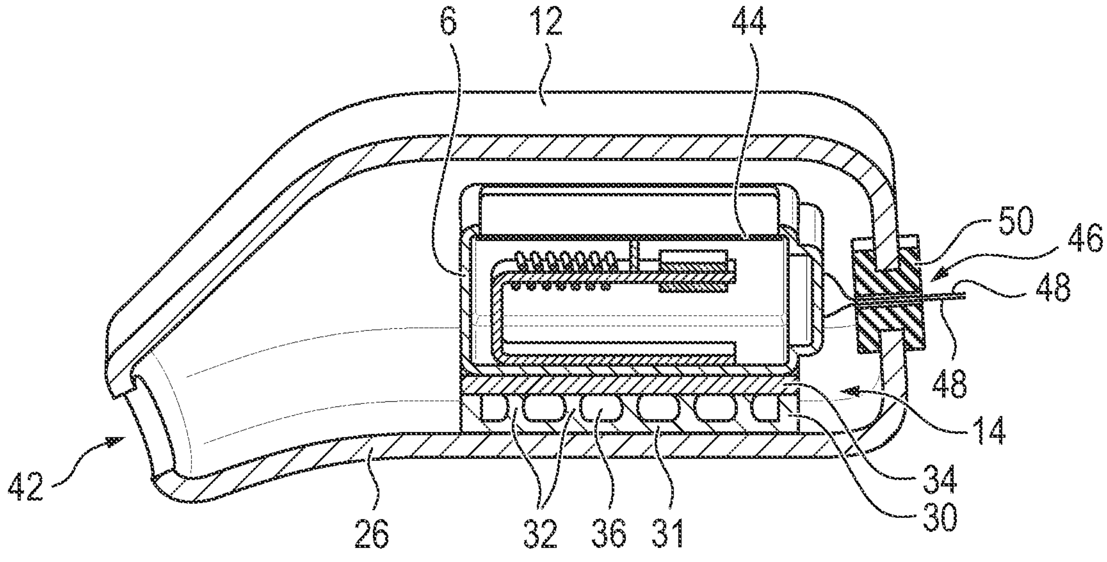
FIG. 5 is a schematic, partial sectional view of a loudspeaker box and a loudspeaker of a further exemplary embodiment of the hearing device.

FIG. 5 shows an alternative exemplary embodiment. Within the box 12, however, no sound tube 16 is present here between the loudspeaker 6 and a sound outlet opening 42 of the box 12. This prevents or reduces the transmission of vibrations via the sound tube to the box 12 and thus to the housing 2 of the BTE 1 and in turn via the latter to the microphones 4. In addition, no pumping of the sound tube due to sound pressure can occur within the box 12, which can result in a loss of power on the one hand and to airborne feedback on the other.

Since there is no sound tube present inside the box 12, the speaker 6 can also be adapted. For this purpose, the loudspeaker 6 is configured with an open front volume, in which a “lid” of the loudspeaker housing, which would be arranged above the sound output side of a loudspeaker diaphragm 44, is missing. The loudspeaker 6 in this exemplary embodiment is shown as a “balanced armature receiver”. The open front volume enables high sensitivity of the BTE 1 in the high-frequency range, in particular in the speech range. Due to the open front volume, the sound outlet nozzle 15 is also missing. Vibrations of the loudspeaker 6 in the direction of the sound outlet opening 42 are therefore not transmitted to the box 12 via the sound outlet nozzle 15 and the sound tube 16.

In this exemplary embodiment, the loudspeaker 6 is not supported by the retaining loops 40. These are not present in this case. Instead, the loudspeaker 6 is glued to the damping element 14, in particular to the covering layer 34.

In the exemplary embodiment according to FIG. 5 the damping element 14 is adhesively bonded to the floor wall 26 and the loudspeaker 6 is in turn bonded to the damping element 14.

An opening 46 of the box 12 for feeding connecting wires 48 through to the loudspeaker 6 is sealed sufficiently tightly by means of a rubber insert 50.

The box 12 is additionally made of a soft magnetic metal with high permeability.

As can be seen from FIGS. 2, 3 and 5, the loudspeaker 6 in each case is mounted with only one side wall against the wall of the BTE 1.

The subject matter of the invention is not restricted to the above-described exemplary embodiments. Rather, further embodiments of the invention can be derived by a person skilled in the art from the above description.

The following is a summary list of reference numerals and the corresponding structure used in the above description of the invention:

1 BTE
2 Housing
4 Microphone
6 Loudspeaker
8 Signal processor
10 Battery module
12 Box
14 Damping element
15 Sound outlet nozzle
16 Sound tube
18 Sound tube
26 Floor wall
30 Damping layer
31 Trough floor
32 Pillar
34 Covering layer
36 Damping chamber
38 Injection channel
40 Retaining loop
42 Sound outlet opening
44 Loudspeaker diaphragm
46 Opening
48 Connection wire
50 Rubber insert
MS Microphone signal
AS Output signal

The invention claimed is:

1. A hearing device, comprising:

a housing enclosing a housing interior and having a wall;

a loudspeaker for generating acoustic signals; and a damping element formed as a damping mat, which is interposed between said loudspeaker and said wall of said housing, said damping mat having at least one sealed damping chamber filled with a contained fluid, said damping mat having a support layer formed from a first elastomer and defining said at least one damping chamber filled with said fluid between said loudspeaker and said wall.

2. The hearing device according to claim 1, wherein said loudspeaker is disposed externally of said damping element.

3. A hearing device, comprising:

a housing enclosing a housing interior and having a wall;

a loudspeaker for generating acoustic signals; and a damping element formed as a damping mat, which is interposed between said loudspeaker and said wall of said housing, said damping mat having at least sealed one damping chamber filled with a contained fluid, said damping mat having a support layer formed from a first elastomer and forming said at least one damping chamber filled with said fluid between said loudspeaker and said wall;

said damping mat having a covering layer; and said support layer has a plurality of pillar-shaped supports supporting said covering layer of said damping mat.

4. The hearing device according to claim 3, wherein said support layer forms a trough with a trough floor, from said trough floor said pillar-shaped supports project upwards, said trough being closed off by said covering layer.

5. The hearing device according to claim 4, wherein said support layer has an injection opening formed therein through which said at least one damping chamber is filled with said fluid and is closed by means of a self-repairing elastomer.

6. The hearing device according to claim 1, wherein said damping element has at least one retaining loop which holds said loudspeaker against said damping mat.

7. The hearing device according to claim 1, wherein said loudspeaker is glued onto said damping element.

8. The hearing device according to claim 4, wherein said covering layer is made of a second elastomer being stiffer than the first elastomer.

9. The hearing device according to claim 6, wherein said at least one retaining loop is made of a second elastomer being stiffer than the first elastomer.

10. The hearing device according to claim 1, wherein said support layer has a plurality of pillar-shaped supports that brace said at least one damping chamber against said loudspeaker and said wall.

11. A hearing device, comprising:

a housing enclosing a housing interior and having a wall;

a loudspeaker for generating acoustic signals;

a loudspeaker box housing said loudspeaker; and a damping element formed as a damping mat, which is interposed between said loudspeaker and said loudspeaker box, said damping mat having at least one sealed damping chamber filled with a contained fluid, said damping mat having a support layer formed from a first elastomer and defining said at least one damping chamber filled with said fluid between said loudspeaker and said loudspeaker box.

12. The hearing device according to claim 11, wherein: said damping mat has a covering layer; and said support layer has a plurality of pillar-shaped supports that support said covering layer of said damping mat.

13. The hearing device according to claim 12, wherein said support layer forms a trough having a trough floor, from said trough floor said pillar-shaped supports project upwards, and said trough being closed off by said covering layer.

14. The hearing device according to claim 13, wherein said support layer has an injection opening formed therein through which said at least one damping chamber is filled with said fluid and which is closed by means of a self-repairing elastomer.

15. The hearing device according to claim 11, wherein said damping element has at least one retaining loop which holds said loudspeaker against said damping mat.

16. The hearing device according to claim 11, wherein said loudspeaker is glued onto said damping element.

17. The hearing device according to claim 16, wherein said loudspeaker has an open front volume and is disposed in said loudspeaker box disposed inside said housing.

18. The hearing device according to claim 17, wherein said loudspeaker is disposed inside said loudspeaker box without a sound tube.

19. The hearing device according to claim 13, wherein said covering layer is made of a second elastomer being stiffer than the first elastomer.

20. The hearing device according to claim 11, wherein said support layer has a plurality of pillar-shaped supports that brace said damping chamber against said loudspeaker and said wall.

* * * * *